Patented Feb. 4, 1947

2,415,252

UNITED STATES PATENT OFFICE 2,415,252

PHENOTHIAZINE DERIVATIVES

Alfred Aaron Levi, Blackley, Manchester, England, assignor to Imperial Chemical Industries Limited, a corporation of Great Britain No Drawing. Application December 11, 1942, Serial No. 468,741. In Great Britain December 26, 1941

3 Claims. (Cl. 260—243)

This invention relates to new phenothiazine derivatives, namely, compounds of the general formula $SC_{12}H_8N.CH_2.OR$ in which R stands for an alkyl or cycloalkyl radical which may carry an alkoxy or other non-reactive substituent.

According to the invention we make the said derivatives by interacting phenothiazine, formaldehyde and an alcohol of the general formula ROH, in which R stands for the same as before, in the presence of water and under conditions such that the pH value of the reaction mixture is between 4.5 and 6.5.

The new compounds are white crystalline solids. By non-reactive substituents we mean substituents which will not react with formaldehyde and/or an alcohol of the said formula ROH. They are stable when dry, but are rapidly decomposed by mineral acids or slowly by water, yielding the original starting materials. They are highly soluble in hydrocarbon and vegetable oils; thus N-pentanoxymethylphenothiazine is soluble in odourless kerosene to the extent of 8–9 parts by weight in 100 parts of kerosene, and in cottonseed oil to the extent of 15 parts in 100 parts by weight. N-dodecanoxymethylphenothiazine and N-hexadecanoxymethylphenothiazine are also very soluble in these two solvents. Both the new compounds and their solutions in oil are useful for pharmaceutical, veterinary and pest control purposes.

In carrying the invention into practical effect it is convenient to use an excess of aqueous formaldehyde.

The following examples, in which parts are by weight, illustrate but do not limit the invention.

Example 1

1 part of phenothiazine, 2 parts of ethyl alcohol, 10 parts of 40% aqueous formaldehyde and 0.1 part of sodium dihydrogen phosphate are boiled together with stirring for 4 hours. The mixture is filtered and allowed to cool. N-ethoxymethylphenothiazine crystallises out in 80% yield as large white crystals in m. p. 113–115° C. It may be recrystallised from ethyl alcohol and obtained with melting point 115° C.

Products may be obtained similarly from isopropyl and butyl alcohols.

Example 2

10 parts of phenothiazine, 10 parts of n-pentanol, 10 parts of 40% aqueous formaldehyde and 0.1 part of sodium dihydrogen phosphate are heated together with stirring at 90–95° C. for 4 hours. N-n-pentanoxymethylphenothiazine separates in good yield from the mixture on filtering and cooling. It can be recrystallised from n-pentanol yielding a product which melts at 95° C.

Example 3

19.9 parts of phenothiazine, 25 parts of 40% aqueous formaldehyde, 37.2 parts of n-dodecyl alcohol and 1.5 parts of sodium dihydrogen phosphate are heated together with stirring at 90–95° C. for 3 hours. The mixture is cooled, extracted with benzene, the benzene extract washed with a little water and dried. The benzene is removed and the oily residue stirred with cold methyl alcohol; white crystals of N-n-dodecanoxymethylphenothiazine separate. They melt at 38–41° C.

Example 4

20 parts of phenothiazine, 23 parts of cyclohexanol, 25 parts of 40% aqueous formaldehyde and 1.5 parts of sodium dihydrogen phosphate are heated together at 90–95° C. until reaction is complete and the product then isolated as in Example 2. It may be recrystallised from benzene giving a product which melts at 170–171° C.

Example 5

By working as in Example 1, but using methyl alcohol instead of ethyl alcohol, methoxymethylphenothiazine, m. p. 115° C., is obtained.

Example 6

By working according to Example 3, but using n-hexadecyl alcohol instead of n-dodecyl alcohol N-n-hexadecanoxymethylphenothiazine, m. p. 58–59° C., is obtained.

As examples of substituted alcohols there may be used the methyl and ethyl ethers of ethylene glycol.

I claim:

1. Phenothiazine derivatives of the general formula $SC_{12}H_8N.CH_2.OR$ in which R stands for a radical selected from the group consisting of alkyl, cycloalkyl alkyloxyalkyl and alkyloxycycloalkyl.

2. Process for the manufacture of new phenothiazine derivatives, namely compounds of the general formula $SC_{12}H_8N.CH_2.OR$ in which R is selected from the class consisting of alkyl and cycloalkyl radicals and alkyl and cycloalkyl radicals substituted with non-reactive substituents, which comprises interacting phenothiazine, formaldehyde and an alcohol of the general formula ROH, in which R stands for the same as before, in the presence of water and under conditions such that the pH value of the reaction mixture is between 4.5 and 6.5.

3. Process as claimed in claim 2 according to which the interaction is effected in the presence of sodium dihydrogen phosphate.

ALFRED AARON LEVI.

REFERENCES CITED

The following references are of record in the file of this patent:

UNITED STATES PATENTS

| Number | Name | Date |
| --- | --- | --- |
| 2,204,653 | Bock | June 18, 1940 |
| 2,217,566 | Smith | Oct. 8, 1940 |
| 2,177,198 | Goldsworthy | Oct. 24, 1939 |
| 2,127,039 | Lindstaedt | Aug. 16, 1938 |

OTHER REFERENCES

Journ. of Proceedings of Royal Society of N. S. Wales, 1939, pages 22–8, 260–247.

Beilstein, vol. 27, page 63.